(12) United States Patent  
Daniel et al.

(10) Patent No.: US 7,520,437 B2  
(45) Date of Patent: Apr. 21, 2009

(54) USB HOST DEVICE FOR PRINTER INTERFACE

(75) Inventors: Stuart Willard Daniel, Lexington, KY (US); Steven Frank Weed, Lexington, KY (US); Michael Ray Timperman, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 75 days.

(21) Appl. No.: 11/157,684

(22) Filed: Jun. 21, 2005

(65) Prior Publication Data

US 2006/0283937 A1    Dec. 21, 2006

(51) Int. Cl.  
*G06K 19/06*    (2006.01)

(52) U.S. Cl. .................. 235/492; 235/382; 235/375

(58) Field of Classification Search ........... 235/382, 235/375, 381, 492; 358/1.14, 1.15; 399/79–81  
See application file for complete search history.

(56) References Cited

U.S. PATENT DOCUMENTS

| | | | |
|---|---|---|---|
| 5,784,581 A | 7/1998 | Hannah | |
| 5,970,220 A | 10/1999 | Bolash et al. | |
| 6,115,137 A | 9/2000 | Ozawa et al. | |
| 6,490,049 B1 * | 12/2002 | Cunnagin et al. | ........... 358/1.13 |
| 6,549,958 B1 | 4/2003 | Kuba | |
| 6,618,566 B2 * | 9/2003 | Kujirai et al. | .................. 399/79 |
| 6,741,746 B2 | 5/2004 | Epstein et al. | |
| 6,753,903 B1 | 6/2004 | Lin | |
| 6,801,959 B1 | 10/2004 | Crutchfield et al. | |
| 6,816,931 B2 | 11/2004 | Shih | |
| 6,880,023 B2 | 4/2005 | Noble et al. | |
| 6,947,164 B2 * | 9/2005 | Kato | ........................ 358/1.15 |
| 7,033,091 B2 * | 4/2006 | Nakao | ........................ 400/76 |
| 7,062,189 B2 * | 6/2006 | Hirano | ........................ 399/80 |
| 7,075,669 B2 * | 7/2006 | Reddy | ........................ 358/1.14 |
| 7,079,276 B2 * | 7/2006 | Kimura | ...................... 358/1.15 |
| 7,113,299 B2 * | 9/2006 | Suzuki et al. | ............... 358/1.15 |
| 7,143,291 B1 * | 11/2006 | Shibata | ........................ 713/182 |
| 7,145,673 B1 * | 12/2006 | Lin | ............................ 358/1.15 |
| 7,149,450 B2 * | 12/2006 | Takemura | ..................... 399/75 |
| 2002/0048104 A1 | 4/2002 | Noble et al. | |
| 2002/0073340 A1 | 6/2002 | Mambakkam et al. | |
| 2003/0060218 A1 | 3/2003 | Billerbeck et al. | |
| 2003/0204661 A1 | 10/2003 | Uemura | |
| 2004/0036895 A1 | 2/2004 | Yano et al. | |
| 2004/0145780 A1 | 7/2004 | Gehring et al. | |
| 2004/0254014 A1 | 12/2004 | Quraishi et al. | |
| 2004/0260854 A1 | 12/2004 | Schade | |
| 2005/0009468 A1 | 1/2005 | Morozumi | |
| 2005/0037807 A1 | 2/2005 | Dove | |
| 2005/0203805 A1 * | 9/2005 | Clough et al. | .................. 705/26 |

* cited by examiner

*Primary Examiner*—Ahshik Kim  
(74) *Attorney, Agent, or Firm*—Grossman, Tucker Perreault & Pfleger, PLLC

(57) ABSTRACT

The present invention relates to providing a printing device which allows for user authentication. The printing device may communicate with the authentication device using universal serial bus (USB) protocol, wherein the printing device contains a universal serial bus (USB) host. User authentication may encompass the provision of valid identifying information or presenting sufficient funds as a condition prior to performing a print job or granting access to data.

17 Claims, 10 Drawing Sheets

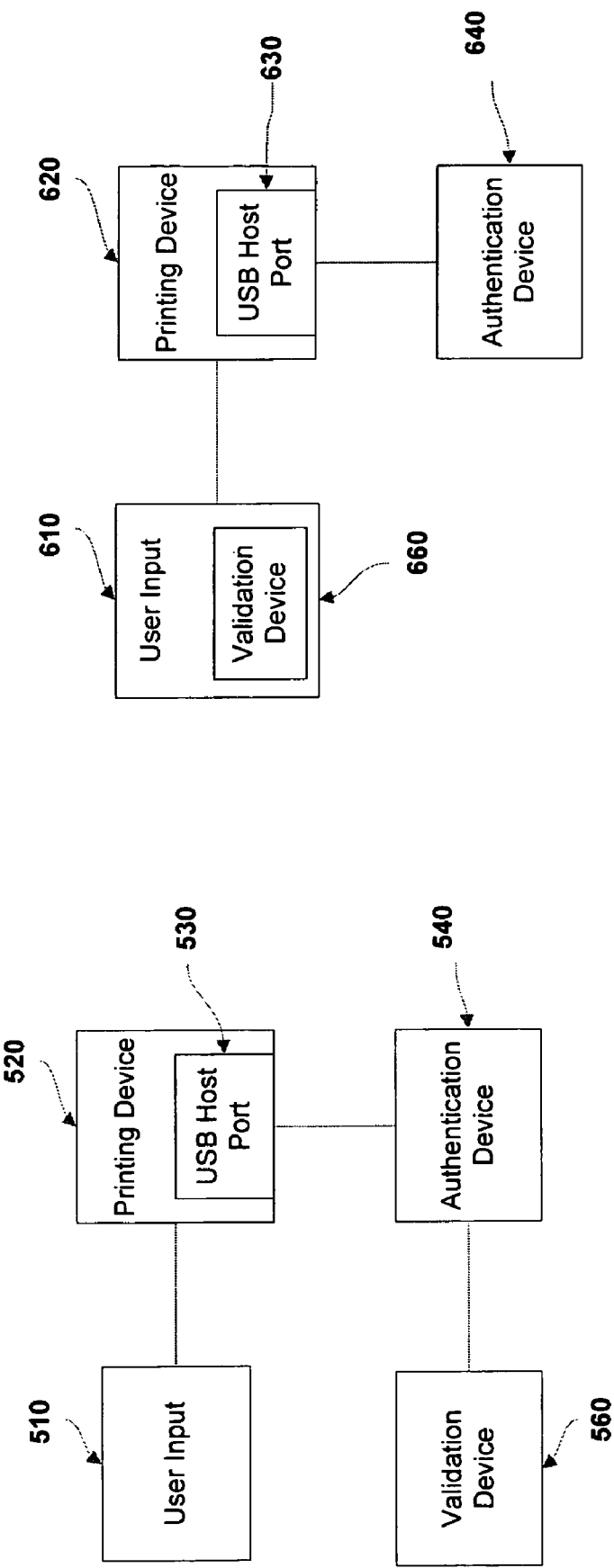

USB HOST DEVICE FOR PRINTER INTERFACE

FIELD OF INVENTION

The present invention relates to a USB host device incorporated in a printer interface. Such USB host device may include a port, which may provide, e.g. an apparatus, method and storage medium for authenticating a user employing the USB host device in connection with a printing device.

BACKGROUND

There may be situations where it may be necessary for a user to demonstrate their identity to a printing device in order to obtain access to data held within a system or in the printing device itself. There may also be situations where it may be desirable for a user to demonstrate to a printing device or system that the user is located in proximity to the printing device or that the user has provided appropriate payment prior to a print being generated.

Accordingly, it may be necessary for a user to provide identification information or funds to a printing device. Identification and/or payment information may include information contained on a magnetic card, smart card, biometric device or manual input device. The user may present these items to an authentication device which may be connected to the printing device.

SUMMARY

An exemplary embodiment of the present invention relates to a device for authenticating a user comprising a printing device containing a USB host, an authenticating device in communication with the USB host according to USB communication protocol capable of receiving information from a user, and a validation device in communication with the authenticating device capable of validating the information received from the user.

Another exemplary embodiment of the present invention relates to a method for authenticating a user of a printing device comprising providing a printing device containing a USB host, providing an authentication device to input authentication information in communication with the USB host according to USB communication protocol, and validating a user.

A further exemplary embodiment of the present invention relates to an article comprising a storage medium having stored thereon instructions that when executed by a machine result in the operation of validating authentication information provided by a user to an authentication device in communication with a printing device including a USB host port wherein the communication is according to USB communication protocol.

BRIEF DESCRIPTION OF DRAWINGS

Features and advantages of the present invention are set forth herein by description of embodiments consistent with the present invention, which description should be considered in conjunction with the accompanying drawings, wherein:

FIG. 5 is an illustration of an exemplary embodiment of the present invention, wherein a validation device may be a stand alone device.

FIG. 6 is an illustration of an exemplary embodiment of the present invention, wherein a validation device may be incorporated into the user input device.

DETAILED DESCRIPTION

Figure 1:
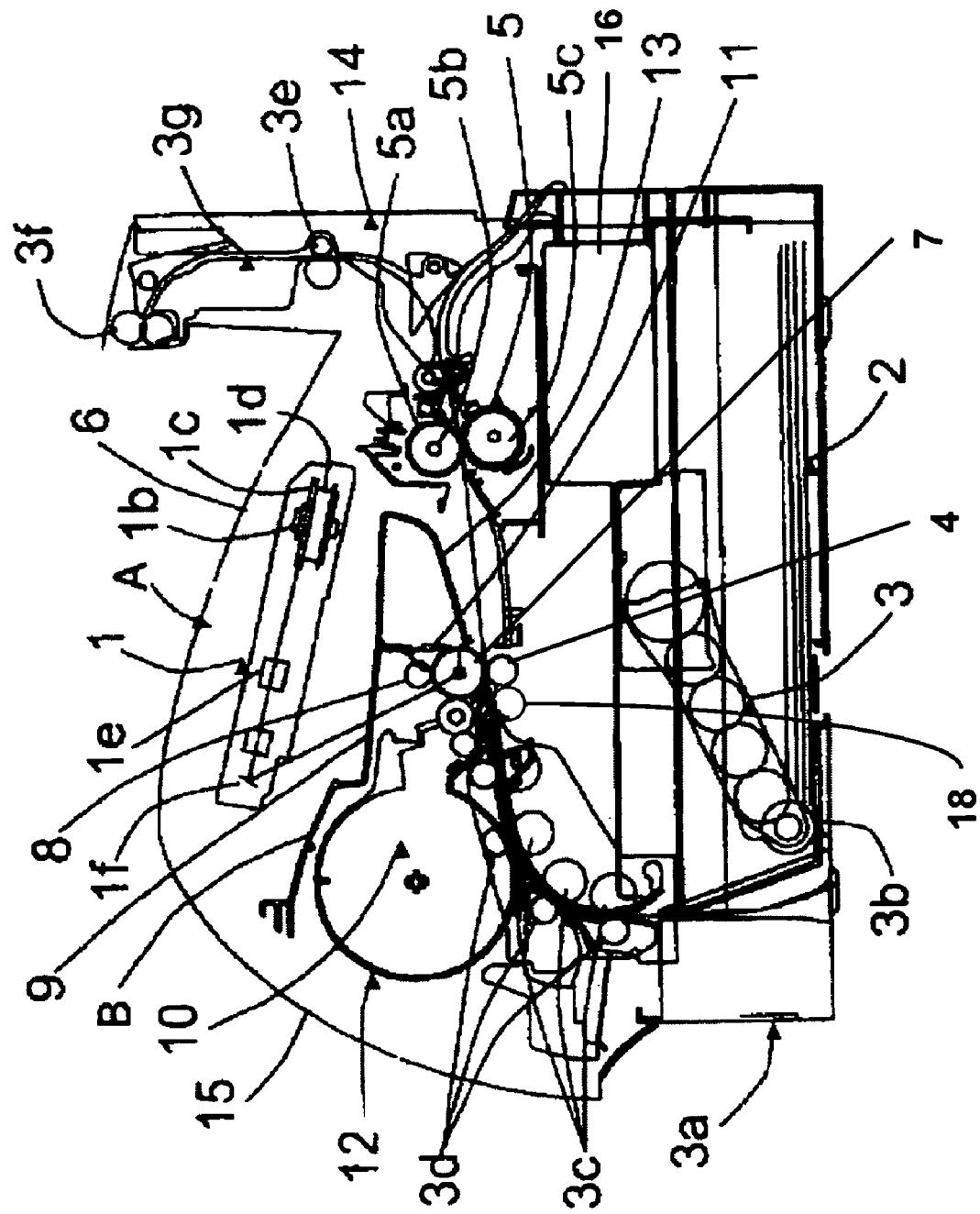
FIG. 1 is a side view of an exemplary embodiment of an electrophotographic device.

The present invention relates to the incorporation of a USB host device in a printing device. The USB host device may include a port or hub in a printing device coupled to an authentication device using USB communication architecture. User authentication as referred to herein may be a condition that may be fulfilled prior to the printing device allowing for an output to occur. Accordingly, authentication may require for the user to demonstrate that the user has fulfilled one or more of a possible number of conditions that may be required prior to the printing device activating or outputting information. For example, in the step of authentication, the user may be required to provide payment prior to using the printing device or the user may be required to demonstrate their identity to the printing device or system.

Furthermore, validation referred to herein may be the process and/or recognition that the authentication information offered by the user is adequate to initiate, e.g., a print cycle or to obtain access to system memory, etc. In such aspect, validation confirms that a condition has been fulfilled that is adequate for the system or apparatus to operate as desired by a user. Furthermore, during the step of validation, the system or apparatus may dynamically evaluate the authenticating information relative to system or apparatus output. For example, if the authenticating information is a page count, the validation will monitor printer output and cease operation when the page count has been reached. Alternatively, the authenticating information supplied by the user to the authenticating device may identify a certain amount of credit funds available to the user and the validation device may monitor a cost per page out put by the printed and then deduct such costs from the credit funds until they are exhausted. Furthermore, the authenticating information may comprise identification of a user and the validation device may approve such user to utilize the printer device or access certain memory locations or even restricted memory locations, as may be desired. Such authentication information for a user may be shared across a number of users or may be unique to each possible user of the apparatus or system.

The printing device may be a printer, copier, fax, all-in-one device or a multifunctional device. Furthermore, the printing device may include one or more USB host ports. The USB host port may be a "USB-A" port, which may provide an interface for a Series "A" Connector. The communications protocol may comply with the USB Specification, Rev. 2.0, incorporated herein by reference, available from USB.org, promulgated by Compaq, Hewlett-Packard, Intel, Lucent, Microsoft, NEC and Philips, revised Apr. 27, 2000 and including all updates available as of Dec. 21, 2000 provided by USB.org.

Authentication may be performed using peripheral devices that may incorporate a variety of devices including, but not limited to proximity devices, biometric devices, manual data entry devices or coin boxes/bill validators. Proximity devices may include magnetic cards or smart cards and the respective card reader or terminal. Biometric devices may include scanners or recognition devices for fingerprint/thumbprints, voice, face, i.e. facial features, hand geometry, handwriting, iris, retinal, vein, etc. Manual data entry devices include keyboards, number pads, personal digital assistants, mice, etc., where the user may enter data such as a password or other identifying information.

In one embodiment, a representative printing device may include an electrophotographic printing device, such as a laser printer illustrated in FIG. 1. The image-forming electrophotographic apparatus A may include the following components: an optical device, a feeding device, a transfer device, a fixing device, and a cartridge mounting device, described herein.

The optical device 1 may project a light image onto a photosensitive drum 7 by projecting light on the basis of image information read from an external apparatus or the like. As shown in FIG. 1, a laser diode 1$b$, a polygon mirror 1$c$, a scanner motor 1$d$, and an image-forming lens 1$e$ may be housed inside an optical unit 1 of the main body 14 of the apparatus. When, for example, an image signal may be supplied from an external apparatus, such as a computer, word processor or imaging device, to the printer or to a microprocessor 16 within the printer, the laser diode 1$b$ may emit light in response to the image signal, and projects the light onto the polygon mirror 1$c$ as image light. Polygon mirror 1$c$ may be rotated at high speed by the scanner motor 1$d$. The image light reflected by the polygon mirror 1$c$ may be projected onto the photosensitive drum 7 via the image-forming lens 1$e$ and reflecting mirror 1$f$. The surface of the photosensitive drum 7 may thus be selectively exposed to form a latent image corresponding to the image information.

The feeding device 3 for feeding the recording medium 2 (e.g., recording paper, cardstock, OHP sheet, envelopes, cloth, thin plate, etc.) may include the following components. A loading portion of a cassette 3$a$ may be provided in the inner bottom portion of the main body 14 of the apparatus. Upon the input of an image formation start signal, the recording media 2 within the cassette 3$a$ may be fed one-by-one from the top of the stack by a pickup roller 3$b$, feeding rollers 3$c$ and follower rollers 3$d$, pressed against the feeding roller 3$c$.

A sheet of recording medium 2 may be fed to the nip portion between the photosensitive drum 7 and the transfer device 4 in synchronization with the performing of the image-formation operation described above, transferring the image to the recording medium. The recording medium 2 onto which a developed image has been transferred may be fed to the fixing device 5 and then ejected onto the ejection tray 6 by a pair of intermediate ejection rollers 3$e$ and a pair of ejection rollers 3$f$. A pair of guide members 3$g$ for guiding the feeding of the recording medium 2 may be provided between each of the above-mentioned pairs of rollers.

The transfer device 4 transfers the developed latent image or toner image formed on the photosensitive drum 7 in the image-forming section onto the recording medium 2. The transfer device 4 consists of the transfer roller 4 as shown in FIG. 1. That is, the recording medium 2 may be pressed by the transfer roller 4 against the photosensitive drum 7 of the loaded process cartridge B. A voltage having a polarity opposite that of the latent image formed on the photosensitive drum 7 may be applied to the transfer roller 4 so that the developing agent on the photosensitive drum 7 may be transferred to the recording medium 2.

The fixing device 5 may fix the developing agent image transferred to the recording medium 2 by applying heat and pressure to the recording medium 2 carrying the toner image. As shown in FIG. 1, the fixing device 5 may comprise a driving rotating roller 5$a$ having a heater 5$b$ therein, and a fixing (pressure) roller 5$c$, rotating in a driven manner in pressed contact with the drive roller 5$a$. More specifically, when the recording medium 2 to which the developing agent image has been transferred moves between drive roller 5$a$ and fixing roller 5$c$, heat may be applied by the heater located in the driving rotating roller 5$a$ and pressure may be applied to the recording medium by the fixing roller 5$c$, thereby causing the developing agent (which comprises a colorant and a thermoplastic component) on the recording medium 2 to melt and become fixed to the recording medium 2.

Furthermore, the microprocessor 16 may include at least one USB host device that may include a port and may communicate with a computer, network, word processor or imaging device, such as a camera or a scanner, using either a USB, IEEE 1394, PCMCIA or other interface, such as wireless or infrared. The microprocessor 16 may also process data within the printer, including data related to sensors and computing algorithms.

A process cartridge loading device by which the process cartridge B may be loaded into the image forming apparatus may be disposed within the apparatus A. Loading and unloading of the process cartridge B to and from the main body 14 of the apparatus may be performed by opening an open/close cover 15. Open/Close cover 15 may be provided with a conventional hinge (not shown) so that it can be opened or closed, and is mounted in the upper portion of the main body 14 of the apparatus. Opening the open/close cover 15 may reveal a cartridge loading space provided inside the main body 14 of the apparatus and may include conventional left and right guide members (not shown) mounted on the left and right inner-wall surfaces of the main body 14. Each of these guide members may be provided with a guide for inserting the process cartridge or developing agent assembly B. The process cartridge or assembly B may be inserted into and along the guides, and by closing the open/close cover 15. Furthermore, the open/close cover 15 may be provided in communication with a sensor (not illustrated), which may be triggered by opening or closing said cover 15.

The process cartridge or assembly B may comprise an image carrier and at least one process means. The process device may include a charging device for charging the surface of the image carrier, a developing device for forming a toner image on the image carrier, a cleaning device for cleaning the toner remaining on the surface of the image carrier, and the like. In the process cartridge B, the charging device 8, the exposure section 9, the developing device 10, and the cleaning device 11 may be arranged around a photosensitive drum 7, which is an image carrier. These elements may be housed within a frame member formed of the developing agent frame member 12 and the cleaning frame member 13 so that they may be formed into one unit, thus making it possible to load and unload the unit into and out of the main body 14 of the apparatus. The process cartridge B may include the following elements: the photosensitive drum 7, the charging device 8, the exposure section 9, the developing device 10 and the cleaning device 11.

The photosensitive drum 7 may have an organic photosensitive layer coated onto the outer peripheral surface of a cylindrical drum base formed from aluminum. The photosensitive drum 7 may be rotatably mounted on a frame member of the cartridge and the driving force of a drive motor disposed in the main body 14 of the apparatus may be transmitted to a drum cap (not shown). As a result, the photosensitive drum 7 may be caused to rotate in the direction of the arrow.

The charging means 8 may be used to uniformly charge the surface of the photosensitive drum 7. Preferably, a so-called contact charging method in which the charging means 8 is mounted on frame member 12 may be used.

The charging means 8 may be brought into contact with the photosensitive drum 7 so that the charging means 8 contacts the photosensitive drum 7 during the image formation. A DC voltage may be applied to the charging means 8 and the surface of the photosensitive drum 7 may be uniformly charged.

An exposure section 9 exposes a light image projected from the optical means onto the surface of the photosensitive drum 7 uniformly charged by the charging roller 8 so that a latent image may be formed on the surface of the photosensitive drum 7. An opening 9 for guiding the light image onto the top surface of the photosensitive drum 7 may be provided to form the exposure section.

It should be appreciated, however, that a number of other printing devices may be contemplated in the present invention, such as inkjet printing device, all-in-one printing devices, faxes, copiers, multi-functional devices, etc.

Figure 2:
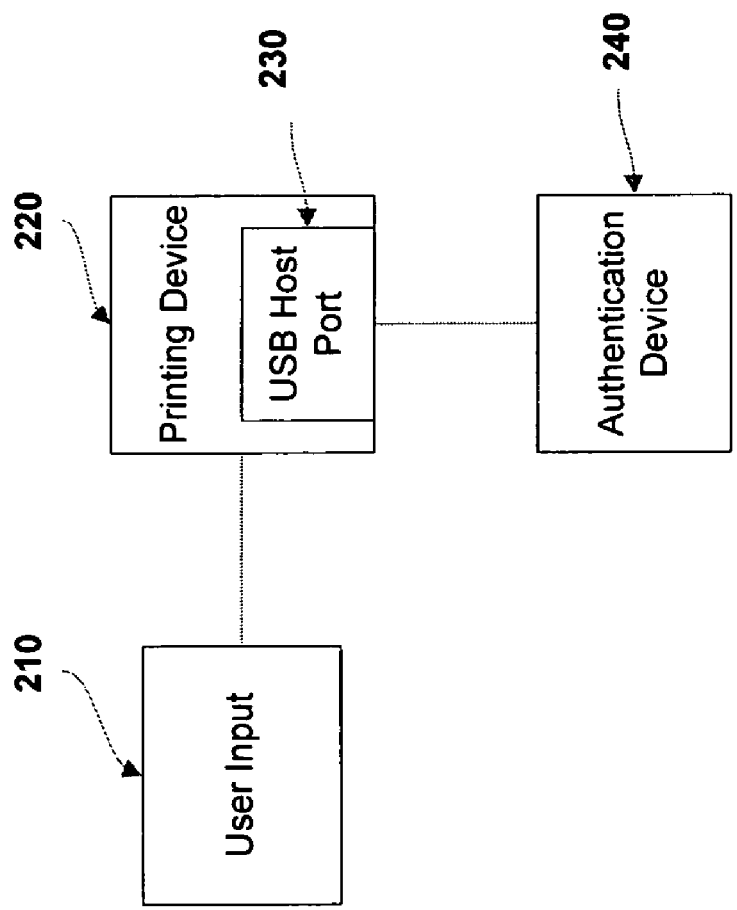
FIG. 2 is an illustration of an exemplary embodiment of the present invention, wherein a user input communicates directly with a printing device.

Illustrated in FIG. 2 is an embodiment of the present invention wherein a user input device 210 may be connected to a printing device 220. The printing device 220 may contain a USB host port 230. The printing device may be connected to an authentication device 240 through the USB host port 230. A user input device 210 may include, but is not limited to, a computer, a non-volatile memory device, a volatile memory device, a scanner, a PDA, etc. Authentication devices 240 may include any of the devices listed herein, i.e. proximity, biometric or manual data entry devices.

Figure 3:
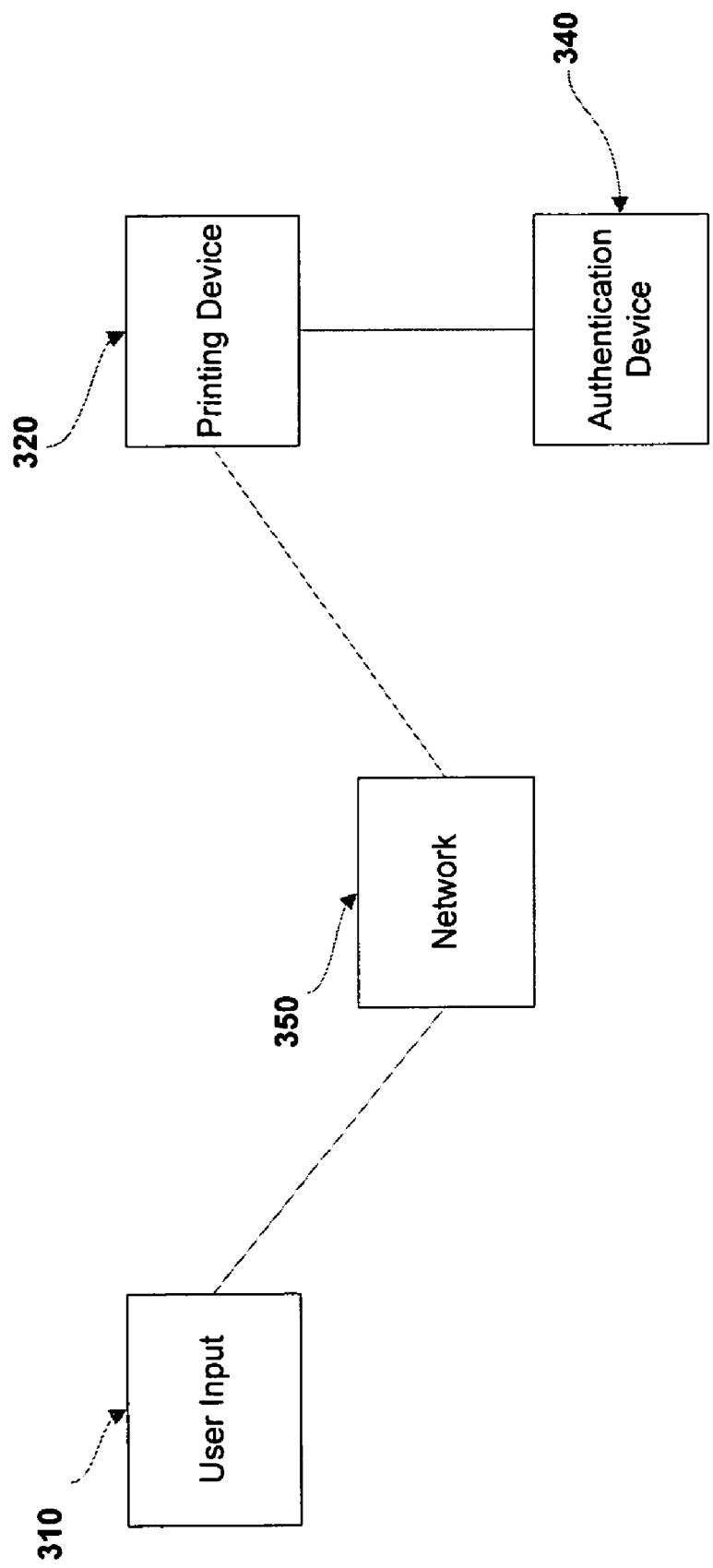
FIG. 3 is an illustration of an exemplary embodiment of the present invention, wherein the user input communicates with a printing device through a network.
Figure 4:
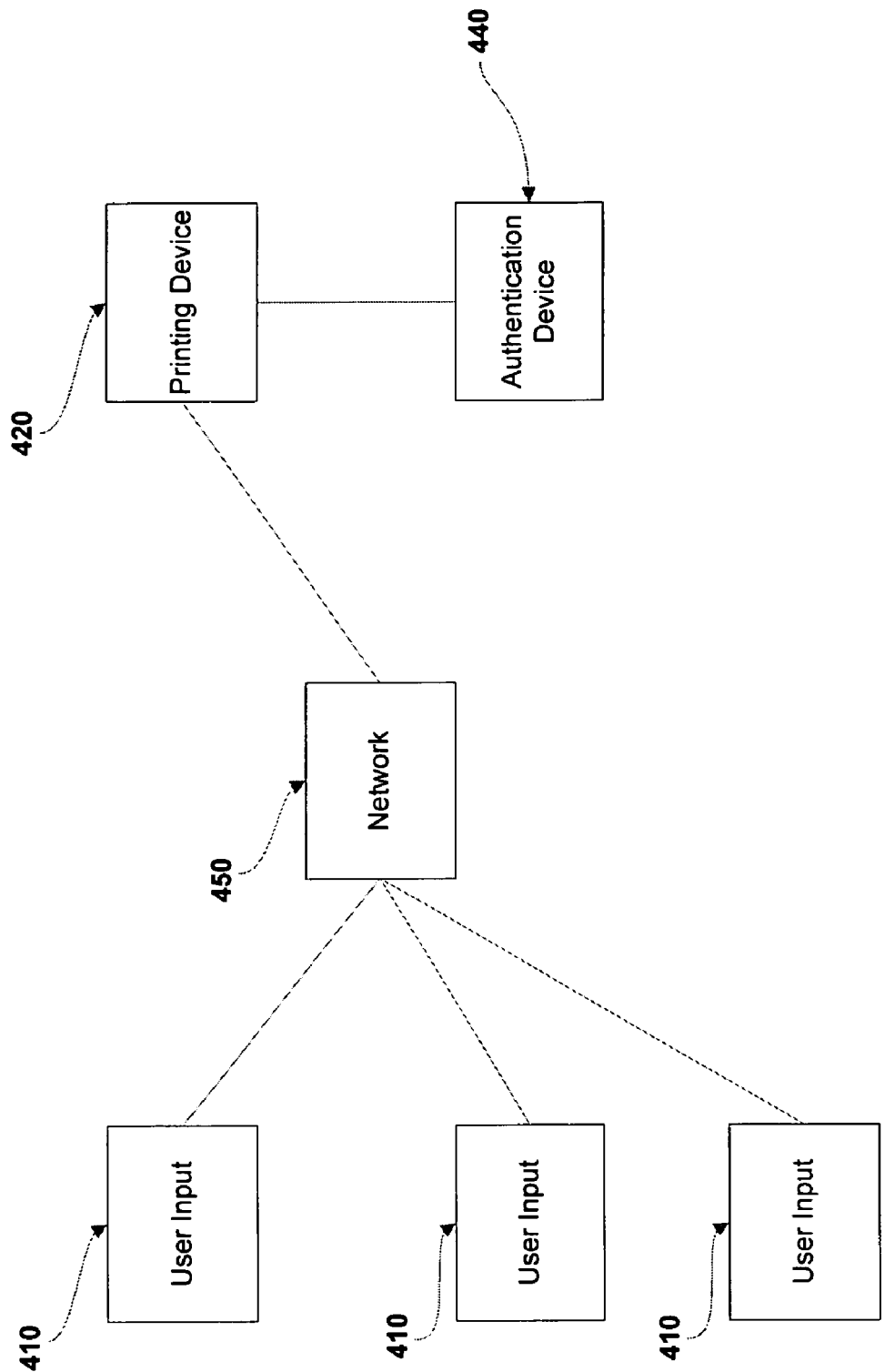
FIG. 4 is an illustration of another exemplary embodiment of the present invention, wherein multiple user inputs communicates with a printing device through a network.

Illustrated in FIG. 3 is an embodiment of the present invention wherein a user input device 310 may be connected to a network 350. A network may be a local area network or a wide area network. The printing device 320 may be connected to the network 350. An authentication device 340 may be affixed to the printing device 320 through a USB host port (not shown) located within the printing device. Furthermore, as illustrated in FIG. 4, a plurality of user input devices 410 may be connected to a network 450.

Figure 7:
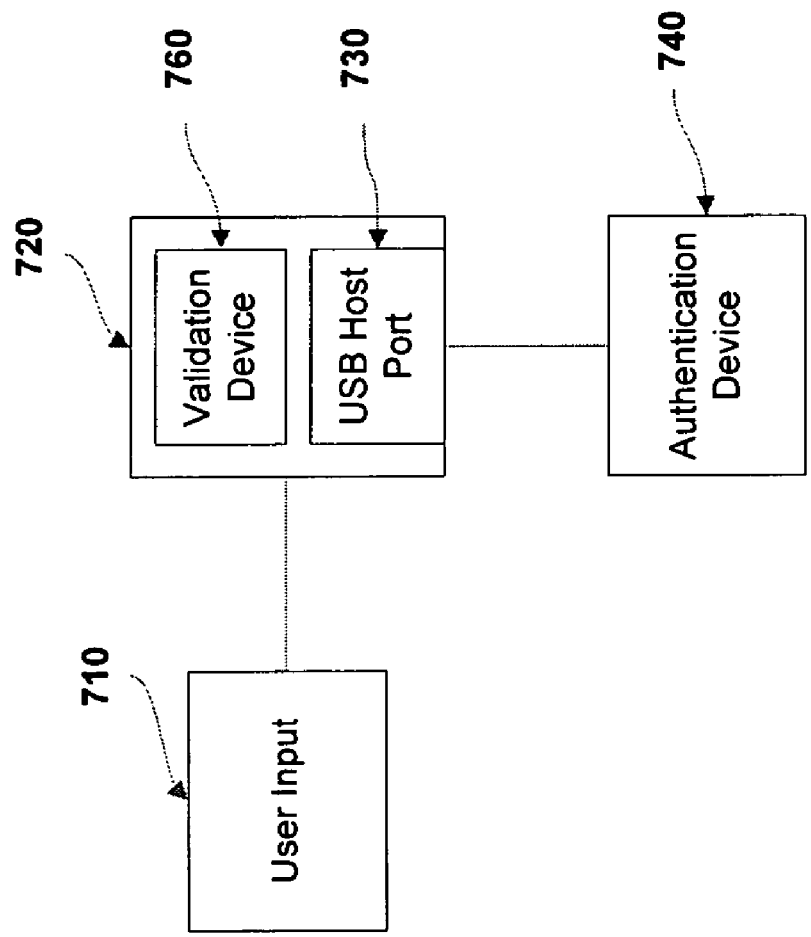
FIG. 7 is an illustration of an exemplary embodiment of the present invention, wherein a validation device may be incorporated into the printer device.
Figure 8:
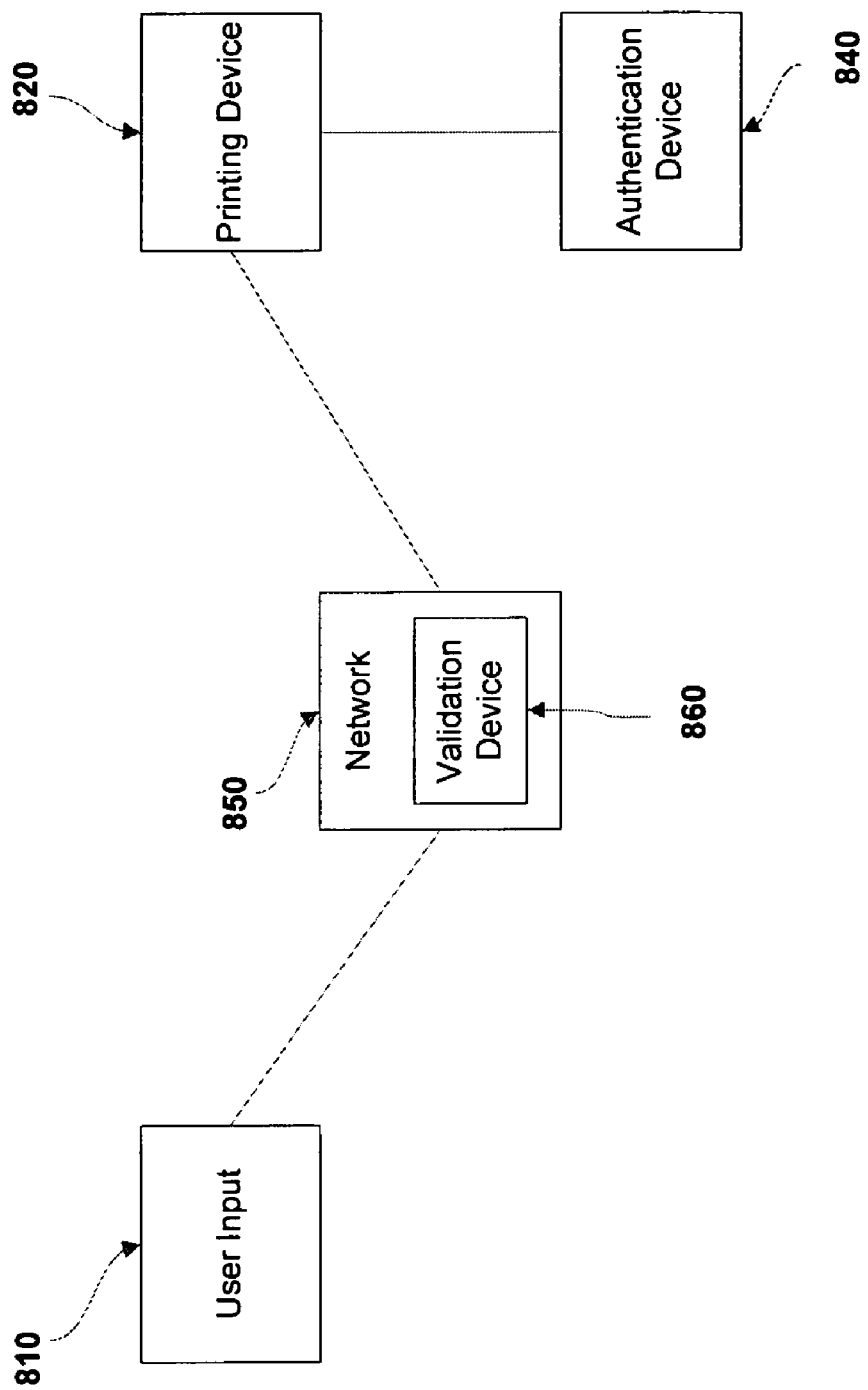
FIG. 8 is an illustration of an exemplary embodiment of the present invention, wherein a validation device may be incorporated into the network.

In one embodiment, validation of the information received by the authentication device may occur within the printer or in other devices in communication with the authentication device, such as a network or in the user input device itself. For example, the validation device 560 may be a stand alone device in communication with the authentication device 540, illustrated in FIG. 5. Accordingly, the validation device may be stored in a secured or public location. It should be appreciated that the communication between the validation device and the authentication device may be through other devices as well. For example the validation device may be a stand alone device that communicates with the authentication device through a network or through the user interface or through the printing device or by a combination thereof. FIG. 6 illustrates a validation device 660 incorporated into the user input device 610. The validation device 760 may also be incorporated into the printing device 720, illustrated in FIG. 7 or incorporated into a network 850 illustrated in FIG. 8.

As alluded to above, the step of validation may be performed by comparing the given information supplied to the authentication device, such as identification information or the amount of funds submitted, to validating information stored within a database or other memory device. It should be appreciated that the validation device may be hardware, software or firmware which may be capable of performing the functions of validation described herein.

Furthermore, cryptographic methods may be applied in the authentication and validation exchange. Cryptographic methods that may be employed may include symmetrical or asymmetrical/public-key encryption methods to prevent an interloper from accessing system data. Cryptographic methods may also be applied, when necessary, in the transfer information to and from the printing device.

Figure 9:
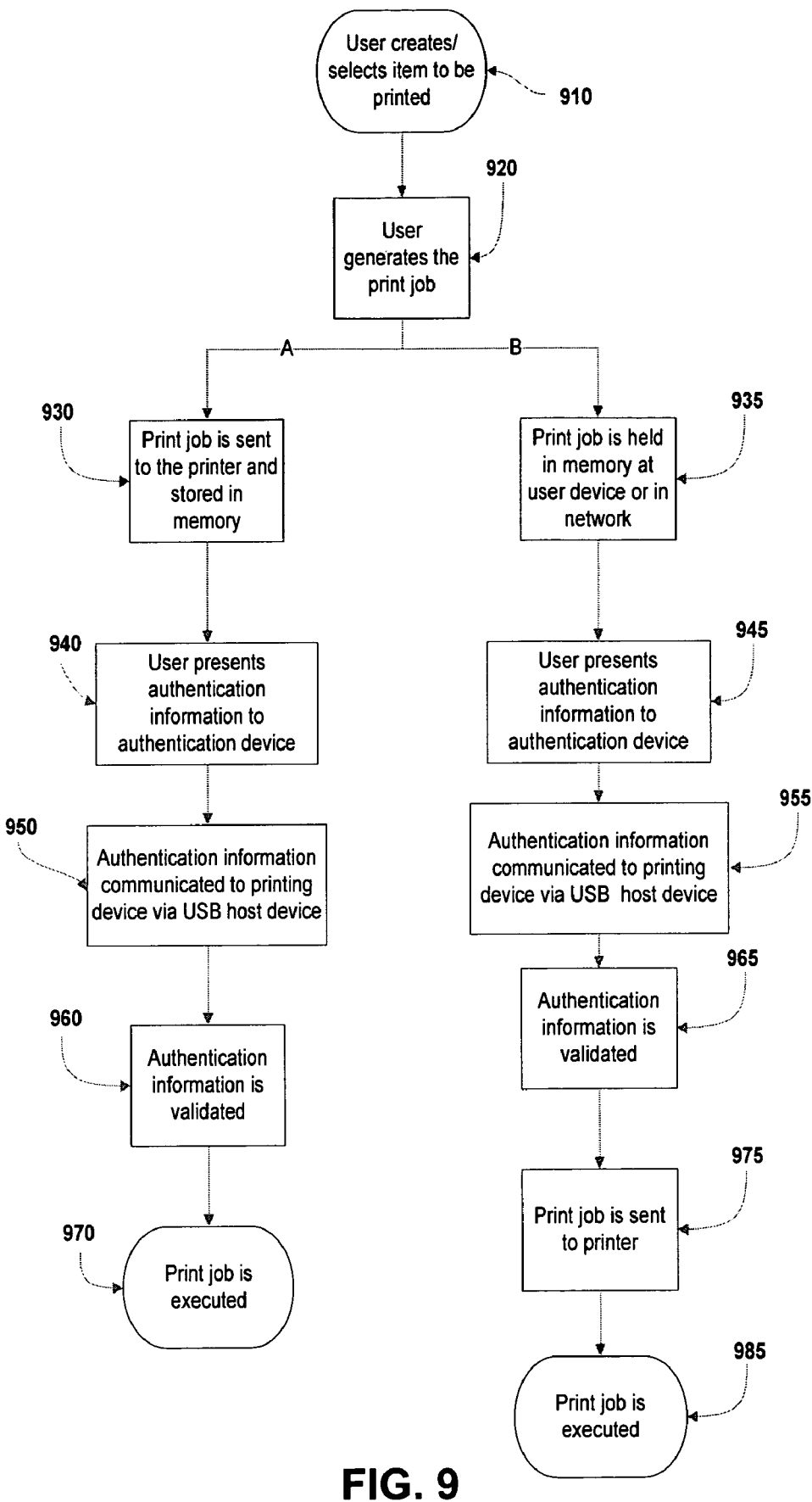
FIG. 9 is an embodiment of the present invention illustrating an exemplary method.

Furthermore, the present invention may relate to a method of utilizing a printing authentication system. An exemplary embodiment of a method of authentication may be illustrated in FIG. 9, as applied to a printing device. A user may create or select an item, such as a data file, to be printed at 910. The user may then generate a print job at 920. The system and method may be executed a number of ways, exemplary embodiments of which are illustrated by method A and B.

System and method A contemplates that the print job may be sent to the printing device and stored in the memory of the printing device, such as a printer, at 930. The user may present authentication information to the authentication device at 940. The authentication information may be communicated to a printing device through the USB host device integrated in the printing device at 950. The authentication information may be validated at 960 and the print job may be executed at 970.

System and method B contemplates that the print job may be held in memory at the user device or in the network at 935. At 945, the user may present authentication information to the authentication device. At 955, the authentication information may be communicated to the printing device through the USB host device integrated in the printing device. The authentication information may then be validated at 965. The print job may then be sent to the printing device, such as a printer, at 975 and then executed at 985.

It should be appreciated that in both systems and methods illustrated above, the authentication information may be validated prior to sending authentication information to the printing device. Thus the authentication device may communicate that the authentication information has been validated to the printing device.

Figure 10:
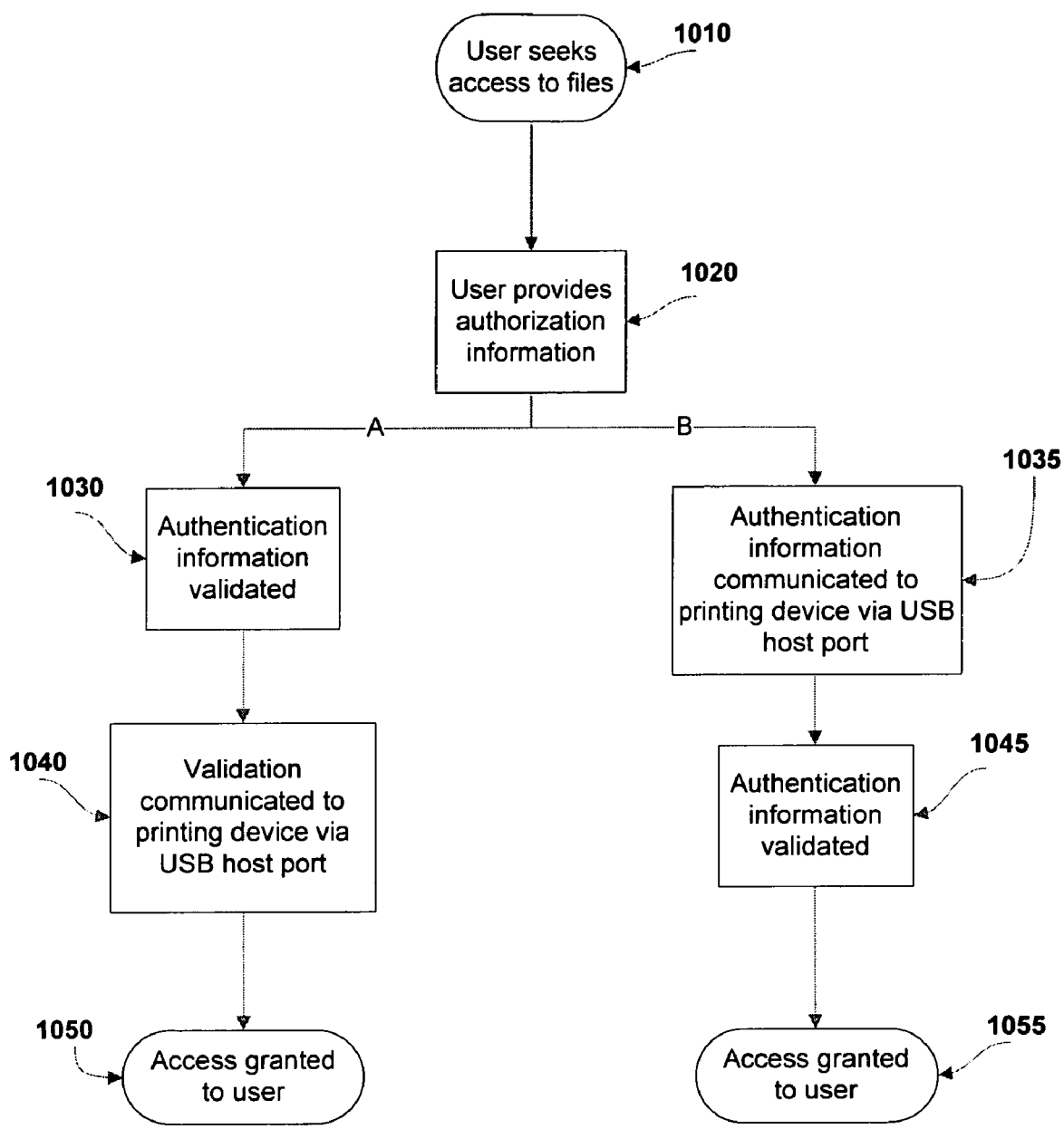
FIG. 10 is an embodiment of the present invention illustrating an exemplary method.

FIG. 10 illustrates another exemplary embodiment of the present invention in which a user may be trying to gain access to data contained within a system. The user may seek to access files in 1010, such as by trying to open, print or otherwise manipulate a secured file. The user may then provide authorization information at 1020 to the authentication device. For example, the user may be prompted or otherwise instructed to provide such information by the printing device. Once again the systems and methods may vary and exemplary embodiments may be illustrated in system A and system B.

In system A, the authentication information may be validated at 1030. This validation may occur anywhere, e.g., within a stand-alone device or elsewhere in a network of devices. The fact of validation may then be communicated to the printing device through a USB host device incorporated into the printing device at 1040. Then at 1050, the access to the files may be granted to the user. In system B, the authentication information may be communicated to a printing device through a USB host port integrated in the printing device at 1035. At 1045, the authentication information may then be validated. At 1055, access to the data files may be granted to the user. Therefore, in system B the authentication information may be first input into the system via USB port, then validated somewhere within the system, at which point access in granted. In system A authentication information and validation is performed within, e.g., the authentication device, at which point access may be permitted.

Figure 11:
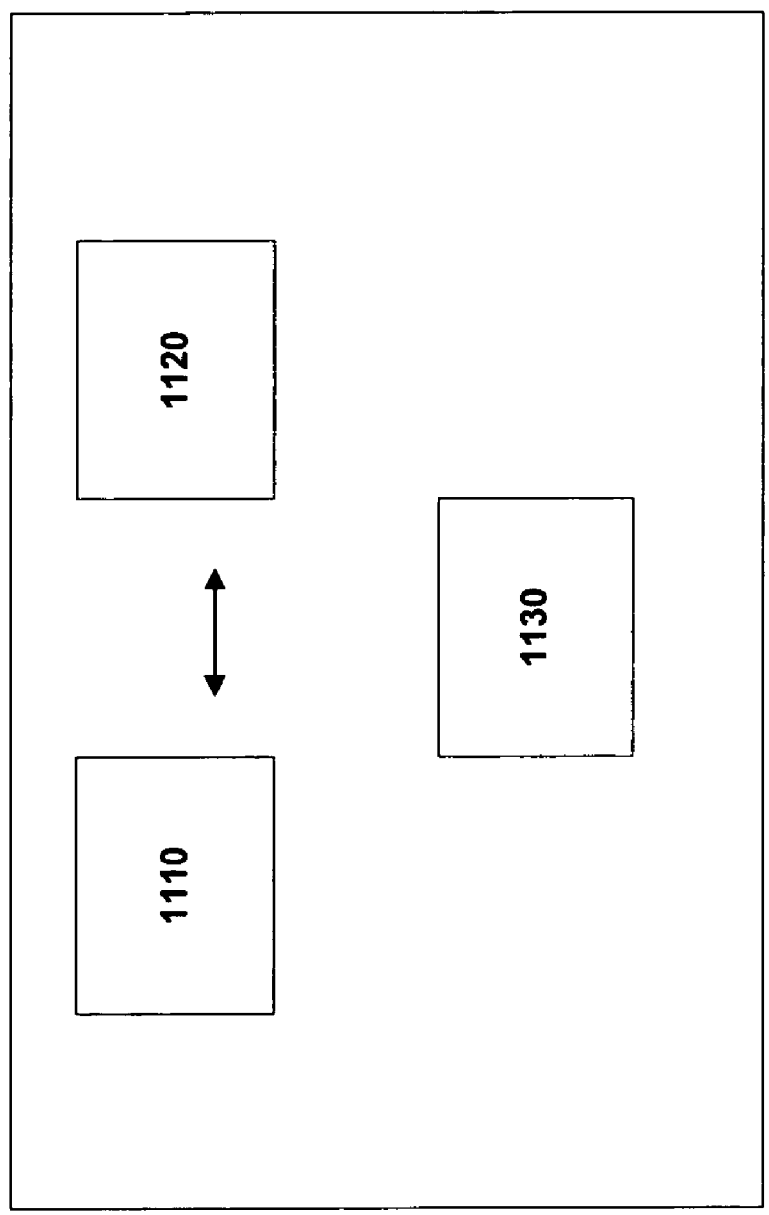
FIG. 11 is an illustration of an exemplary embodiment of the present invention relating to an article of machine readable media in relation to a processor and a user interface.

It should also be appreciated that the functionality described herein for the embodiments of the present invention may be implemented by using hardware, software, or a combination of hardware and software, either within the printer or copier or outside the printer copier, as desired. If implemented by software, a processor and a machine readable medium are required. The processor may be of any type of processor capable of providing the speed and functionality required by the embodiments of the invention. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in either a compressed and/or encrypted format. Accordingly, in the broad context of the present invention, and with attention to FIG. 11, the printer or copier may contain a processor 1110 and machine readable media 1120 and user interface 1130. It should be appreciated that the user interface may be any interface that the user has with the printing device, or any device that may be in communication with the printing device in which the user may input into the printing device. Devices in communication with the printing device may include, but are not limited to, computers, storage media, scanners, or other devices.

The foregoing description is provided to illustrate and explain the present invention. However, the description hereinabove should not be considered to limit the scope of the invention set forth in the claims appended here to.

What is claimed is:

1. A device for authenticating a user comprising:
a printing device containing a USB host including a memory location;
a user input device in communication with said printing device, wherein said user input device is capable of inputting signals to said printer to generate a print job;
an authenticating device in communication with said USB host according to USB communication protocol capable of receiving authentication information from a user; and
a validation device in communication with said authenticating device capable of validating said authentication information received from said user and confirming that a condition has been fulfilled by said user, wherein said condition is required for said printing device to operate and changes as a result of operation of said printing device as said printing device executes print jobs, said validation device being configured to monitor an output of said printing device to confirm that said condition remains fulfilled and to cease operation of said printing device if said condition is no longer fulfilled, wherein the validation device is further configured to approve or deny access to said memory location for said user across a number of users.

2. The device of claim 1, further comprising:
a network in communication with said user input device and said printing device.

3. The device of claim 1, wherein said authentication device is selected from the group consisting of a biometric device, a proximity device, a manual input device, a coin/bill validator and combinations thereof.

4. The device of claim 1, wherein said validation device is contained within said printing device.

5. The device of claim 1, wherein said validation device is contained within said authentication device.

6. The device of claim 1, wherein said condition is associated with a page count allowed for said user, and wherein said validation device is configured to monitor a page count output of said printing device and to cease operation of said printing device when said page count is reached.

7. The device of claim 1, wherein said condition is associated with an amount of credit funds available to the user, and wherein said validation device is configured to monitor a cost per page output by said printing device and to cease operation of said printing device when a deduction of costs from said credit funds results in said credit funds being exhausted.

8. A method for authenticating a user of a printing device comprising:
providing a printing device containing a USB host including a memory location;
providing an authentication device to input authentication information in communication with said USB host according to USB communication protocol;
validating said authentication information provided by a user to confirm that a condition has been fulfilled by said user, wherein said condition is required for operation of said printing device and changes as a result of operation of said printing device as said printing device executes print jobs;
operating said printing device by generating a print job and printing said print job;
monitoring an output of said printing device during operation to confirm that said condition remains fulfilled; and
ceasing operation of said printing device if said condition is no longer fulfilled wherein the validation device is further configured to approve or deny access to said memory location for said user across a number of users.

9. The method of claim 8, wherein said printing device is component of a system which contains data and providing access to said data subsequent to validating said user.

10. The method of claim 8, wherein said authentication information may be selected from the group consisting of identification information, payment information and combinations thereof.

11. The method of claim 8, wherein said authentication information is provided in the form selected from the group consisting of biometric information, proximity devices, manual data entry devices and combinations thereof.

12. The method of claim 8, wherein said authentication information is encrypted.

13. The method of claim 8, wherein said condition is associated with a page count allowed for said user, wherein monitoring the output of said printing device includes monitoring a page count output, and wherein operation of said printing device is ceased when said page count is reached.

14. The method of claim 8, wherein said condition is associated with an amount of credit funds available to the user, wherein monitoring the output of said printing device includes monitoring a cost per page output, and wherein operation of said printing device ceases when a deduction of costs from said credit funds results in said credit funds being exhausted.

15. An article comprising:

a storage medium having stored thereon instructions that when executed by a machine result in the following operations:

validating authentication information provided by a user to an authentication device in communication with a printing device having a memory location including a USB host port wherein said communication is according to USB communication protocol to confirm that a condition has been fulfilled by said user, wherein said condition is required for operation of said printing device and changes as a result of operation of said printing device as said printing device executes print jobs;

operating said printing device by generating a print job and printing said print job;

monitoring an output of said printing device during operation to confirm that said condition remains fulfilled; and ceasing operation of said printing device if said condition is no longer fulfilled, wherein the validation device is further configured to approve or deny access to said memory location for said user across a number of users.

16. The article of claim 15, wherein said storage medium having stored thereon further instructions that when executed by a machine result in the following operations:

providing to a user access to data files.

17. The article of claim 15, wherein said storage medium having stored thereon further instructions that when executed by said machine result in the following additional operations:

encrypting said information.

\* \* \* \* \*